United States Patent [19]

Nishio et al.

[11] Patent Number: 4,909,973
[45] Date of Patent: Mar. 20, 1990

[54] METHOD FOR REFINING NON-OXIDE CERAMIC POWDERS

[75] Inventors: Hiroaki Nishio; Michitaka Sato, both of Tokyo, Japan

[73] Assignee: Nippon Kokan Kabushiki Kaisha, Tokyo, Japan

[21] Appl. No.: 68,947

[22] Filed: Jul. 1, 1987

[30] Foreign Application Priority Data

Jul. 2, 1986 [JP] Japan .................................. 61-154160

[51] Int. Cl.$^4$ .............................................. C04B 38/06
[52] U.S. Cl. ...................................... 264/63; 156/635; 156/646; 264/344
[58] Field of Search .................. 264/63, 344; 156/635, 156/646

[56] References Cited

U.S. PATENT DOCUMENTS 4,124,665 11/1978 Peterson et al. ...................... 264/63
4,238,434 12/1980 Enomoto et al. ...................... 264/63

OTHER PUBLICATIONS

Brynestad et al, Communications of the American Ceramic Society, 1983, C-215 & 216.
Brynestad et al, Communications of the American Ceramic Society, 1984, C-184 & 185.

*Primary Examiner*—James Derrington
*Attorney, Agent, or Firm*—Frishauf, Holtz, Goodman & Woodward

[57] ABSTRACT

A method for refining powders comprising the steps of: (a) adding polytetrafluoroethylene powders to non-oxide ceramic powders to form a mixture by mixing; and (b) heating the mixture in non-oxidizing atmosphere to convert oxides existing on the surface of the non-oxide ceramic powders into gaseous fluorides, and removing gaseous fluorides. The fluororesin is a polytetrafluoroethylene resin. The heating temperature in the non-oxidizing atmosphere is 500° C. to 1300° C.

20 Claims, No Drawings

METHOD FOR REFINING NON-OXIDE CERAMIC POWDERS

BACKGROUND OF THE INVENTION

1. Field of the Invention

The present invention relates to a method for refining non-oxide ceramic powders used for wear-resistant, heat-resistant and corrosion-resistant materials, and more particularly to a method for refining non-oxide ceramic powders by means of removing oxides existing on the surface of the non-oxide ceramic powders.

2. Description of the Prior Arts

Recently, remarkable attention has been paid to non-oxide ceramics as wear-resistant, heat-resistant and corrosion-resistant material. For example, nitride such as silicon nitride, aliminium nitride, boron nitride, chromium nitride or titanium nitride, carbide such as silicon carbide, boron carbide or titanium carbide, and boride such as titanium boride or zirconium boride are the mentioned ceramics.

Those non-oxide ceramic powders include impurities mostly in the form of metallic or other various oxides. The oxides existing on the surface of the non-oxide ceramics, above all, are one of the typical impurities.

Non-oxide ceramic material powders are, in general, used as ultra-fine grains of 3 micron or less in size. Most of these powders, however, are forced to include, more or less, 1 to several % of oxide in their reaction or handling process.

In a grinding process wherein sub-micron grains of the non-oxide ceramics are produced, quantity of oxygen contamination tends to increase as the mean particle size becomes smaller. Oxygen, existing on the surface of the ceramic powders, bonds with metallic elements of ceramics to form metal oxides on the surface of the ceramic powders. For example, silicon compounds such as $SiN_4$ or SiC, titanium compounds such as $TiB_2$ or TiN, and boride compounds such as BN, each, form $SiO_2$, $TiO_2$ or $B_2O_3$ respectively. Those metallic oxides are such a material obstacle to mass transfer that the sintering performance of the ceramic powders is seriously impaired. In addition, those metallic oxides remain in the form of quasi-grain boundary or inclusions in the sitering ceramic powders, and lower the Weibulls factor showing high temperature bending strength and reliability.

To overcome the above-mentioned difficulties, it is required to remove such oxides existing on the surface of non-oxides ceramic powder materials. Conventionally, the following methods for removing the oxides are well known.

(a) The oxides are cleaned in hydrofluoric acid solution, hydrofluoric acid-hydrochloric acid solution, sulfuric acid solution or nitric acid solution.

(b) The oxides are brought into contact with halogen gases.

(c) The oxides are heated to 1,000°–2,000° C. in vacuum atmosphere, reducing gases or inert gases.

Method (a) is useful for removing not only free silica but also metal impurities such as Fe and Mg. This method, however, requires filtration, drying, and waste liquid treatments after long time cleaning in the voluminous solution. Consequently, the method is forced to be intricate and is unfit for mass production. Furthermore, because metal impurities gradually concentrate in the process of reusing solution repeatedly or of recycling solution, reproduction of cleaning capability is unsatisfactory. In addition, due to the dried ceramic powder material being easy to agglomerate, it is necessary to break the dried material into pieces before processing.

In method (b), as halogen gases, for example, chloride, hydrogen fluoride or boron chloride is known. Boron chloride gas is effective in removing $TiO_2$ existing on the surface of $TiB_2$ powders, as shown in Communication of Am. Ceramic Soc., C215, 1983. Hydrogen fluoride gas is useful for removing $SiO_2$ existing on the surface of SiC powders, as shown in Communication of Am. Ceramic Soc. C-184, 1984. The hydrogen gas application, however, is carried out at high temperature. This results in fear for corroding the ceramic powders themselves in addition to removal of the oxides, accompanying corrosion of the equipment, and inevitably including impurities. Therefore, this method requires a suitably select gases being capable of reacting selectively on the surface oxides, depending on properties of powder materials, and being less corrosive against the equipment.

In method (c), for example, reducing gases are hydrogen and carbon monoxide, and inert gases are argon, helium and nitrogen. The removal by those gases are comparatively easy in treatment, and, absorption water, hydroxide groups or oxides existing on the surface of the powder materials can be removed to some extent. This method, however, requires a high temperature of 1000° to 2000° C., and, therefore is a little far from an effective method in commercial production.

SUMMARY OF THE INVENTION

It is an object of the present invention to provide a method for removing oxides existing on the surface of non-oxides ceramic powder materials more simply and efficiently.

In accordance with the present invention, a method is provided for refining non-oxide ceramic powders comprising the steps of:

adding powders of polytetrafluoroethylene resins to non-oxide ceramic powders to form a mixture by mixing; and heating the mixture at the temperature of 500°–1300° C. in non-oxidizing atmosphere to allow oxides existing on the surface of the non-oxide ceramic powders to convert into gaseous fluorides, the gaseous fluorides being removed.

Furthermore, a method is provided for refining non-oxide ceramic powder comprising the steps of:

adding powders of polytetrafluoroethylene resins to non-oxide ceramic powders to form a mixture;

compacting the mixture into a green compact; and heating the green compact at the temperature of 500°–1300° C. to allow oxides existing on the surface of the non-oxide ceramic powders to convert into gaseous fluorides, thereby the gaseous fluorides being removed.

Other objects and advantages of the present invention will become apparent from the detailed description to follow taken in conjunction with the appended claims.

DETAILED DESCRIPTION OF THE PREFERRED EMBODIMENT

The present invention will be now described in detail with reference to preferred embodiment given below:

EMBODIMENT 1

The present invention intends to remove oxides existing on the surface of non-oxides ceramic powders by making use of gases which are generated when polytetrafluoroethylene resins are pyrolyzed. Polytetrafluoroethylene is pyrolyzed at the temperature of 350° C. or more to generate a gaseous pyrolysis product having mainly a composition of tetrafluoroethylene ($C_2F_4$) when fluororesin is pyrolyzed. For example, when tetrafluoroethylene resins are pyrolyzed at the temperature of 90° C. and at the reduced pressure of 70 Torr, 83 vol.% of $C_2F_4$ and 17 vol. % of $C_3F$ are generated.

Furthermore, tetrafluoroethylene gas can be converted into metal fluoride when the gas reacts with metal oxides existing on ceramic powders. For example, when silica is brought into contact with tetrafluoroethylene at 600° C., gaseous silicon fluoride is generated by the following reaction formula (1):

$$SiO_2 + C_2F_4(g) \rightarrow SiF_4 + 2CO(g) \quad (1)$$

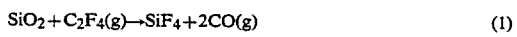

Even titanium oxide can be converted into gaseous titanium fluoride by the formula (2) given below:

$$TiO_2 + C_2F_4(g) \rightarrow TiF_4(g) + 2CO(g) \quad (2)$$

Boron oxide can be converted into gaseous boron fluoride as well by the formula (3) given below:

$$\tfrac{2}{3}B_2O_3 + C_2F_4(g) \rightarrow 4/3\ BF_3(g) + 2CO(g) \quad (3)$$

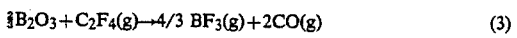

Zirconium oxide is converted, at the temperature of 930° C. and more, to gaseous zirconium fluoride by the formula (4) given here below. When the temperature is less than 930°, solid zirconium fluoride is produced. The solid zirconium fluoride is, however, sublimated and removed, for example, by heating at 800° C. and maintaining the atmosphere at the reduced pressure of 0.05 Torr.

$$ZrO_2(S) + C_2F_4(g) \rightarrow ZrF_4(g.s) + 2CO(g) \quad (4)$$

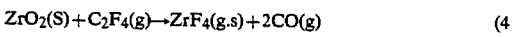

In the case of alumina, solid aluminium fluoride is produced as shown in the following formula:

$$\tfrac{2}{3} Al_2O_3 + C_2F_4(g) \rightarrow 4/3\ AlF_3(s) + 2CO(g) \quad (5)$$

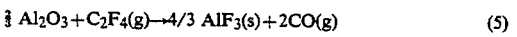

This solid aluminium fluoride is sublimated and removed at 800° C. and in the atmosphere at the reduced pressure of 0.01 Torr.

Tetrafluoroethylene-ethylene copolymer resin is pyrolyzed to generate tetrafluoroethylene and hydrogen fluoride. This hydrogen fluoride also reacts effectively with metal oxides.

In this embodiment, as the polytetrafluoroethylene resins, tetrafluoroethylene resins or tetrafluoro-ethylene-ethylene copolymer resins are used. But not limited to those, tetrafluoroethylene-hexafluoroplopylene copolymer resins and tetrafluoroethyleneperfluoroalkyl-vinylether copolymer resins can be substituted.

The polytetrafluoroethylene resins are added by 1–10 wt. % to non-oxide ceramic powders. More preferably, the amount ranges from 1 to 5 wt. %. If the amount is less than 1 wt. %, the oxides existing on the surface of the non-oxide ceramic powders are not sufficiently removed. Even if the amount is over 10 wt. %, the removal effect is not remarkably increased.

As the non-oxide ceramics, ceramics composed of nitride, carbide or boride can be used. The nitride ceramics are silicon nitride, aluminum nitride, boron nitride, chromium nitride and titanium nitride. The carbide ceramics are silicon carbide, boron carbide and titanium carbide. The boride ceramics are titanium boride and zirconium boride.

It is recommendable that the mixture of non-oxide polytetrafluoroethylene resin with the non-ceramic powders is heated at the temperature of 500°–1300° C.

If the temperature is less than 500° C., conversion of the metallic oxides into metal fluorides proceed slow in its reaction. On the other hand, if the temperature is over 1300° C., the non-oxide ceramic powders are badly affected in such a manner as the powders become large in particle size or begin to be sintered.

The reaction process is required to be processed in a non-oxidizing atmosphere so as to prevent the oxidation. The atmosphere at the pressure of 100 Torr or less is preferable. In this atmosphere, ethylene-fluoride gas is generated, and, at the same time, the conversion of the oxides into the fluoride gases is accelerated.

Another embodiment of the present invention will now be described with reference specifically to the following example.

EMBODIMENT 2

Powders of polytetrafluoroethylene resins are used as solid lubricant in the compacting process, and, furthermore, in removing oxides existing on the surface of non-oxide ceramic powders. Firstly, powders of polytetrafluoroethylene resins are mixed with non-oxide ceramic powders to form a solid green compact, and, at the same time, are used as solid lubricant in the powder compaction process.

Subsequently, the green compact is heated in a non-oxidizing atmosphere, and the polytetrafluoroethylene resin included in the compact, is pyrolyzed to generate tetrafluoroethylene gas. The generated gas allows the oxides existing on the surface of the non-oxide ceramic powders, which constitute the green compact, to convert into gaseous fluoride, thereby the surface of non-oxide ceramic powders sublimes.

Polytetrafluoroethylene resins used as solied lubricant ranges preferably 0.5 to 2.0 wt. % in amount.

Polytetrafluoroethylene resins show an excellent lubricative characteristic as represented by a friction coefficient of 0.1 or less. This enables compacting non-oxide ceramic powders without using, a conventional lubricant, such as stearic acid and metallic stearate powders.

As described in the above, when non-oxide ceramic powders are mixed with powders of polytetrafluoroethylene resins and then, heated in non-oxidizing atmosphere, oxides existing on the surface of the nonoxide ceramic powders are easy to convert into gaseous fluoride, the gaseous fluoride sublimes. Thus, the present invention provides a simple and effective means for removing oxides existing on the surface of non-oxide ceramic powders. Furthermore, for example, in comparison with a method wherein oxides are cleaned in fluoric acid solution, the present invention is simple and economical, and, in addition, avoid agglomaration of material powders occuring after the removal of the oxides, for example, in hydrofluoric acid, because the present method is a dry process. The present invention is exceedingly effective in refining non-oxide ceramic powders.

EXAMPLE 1

Material used were $Si_3N_4$ powders whose mean particle size was 0.6 μm. The chemical analysis values of those powders were shown in Table 1. The powders contained 2.1 wt. % oxygen. The starting powders were prepared by adding perfluorooligomer-resin of 1 μm in particle size to the original powders. The adding ratio to the original material was 1.5 wt. %. 27 wt. % of the starting powders and 73 wt. % of propionic acid were put into a small agitator mill. The propionic acid was the solvent. The mixture were agitated for 2 hours and then, transferred, as a slurry, into a sealed vessel. The slurry mixture was put into a rotary evaporator and heated at 90° C. and at vacuum of 0.1 Torr, thereby the propionic acid being removed. 100 g of the obtained powders were taken in a nickel boat, and the boat was placed in a tube furnace. In the tube furnace, the powders were firstly heated at 300° C. to remove moisture adhering physically to the powders, and then, inside gases were exhausted until the furnace inside pressure had reached the level of $10^{-3}$ Torr, the furnace inside being sealed. Subsequently, the temperature of the furnace inside was raised to 600° C., which was kept for 30 minutes. Further, the temperature was raised to 900° C. and inside gases were exhausted until the pressure inside the furnace had reached to $10^{-3}$ Torr. Lastly, the temperature was lowered and the furnace was back-filled with $N_2$ to 1 atm. The results of analyzing oxygen and impurities contained in the obtained powders are shown in Table 1. The oxygen content after the treatment of the present invention was remarkably reduced to a level of 0.08 wt. %.

CONTROL 1

100 g $Si_3N_4$ of the same powders used in Example 2 were dispersed for 30 minutes in an excess amount of HCl-HF solution of 50 vol. %. Subsequently, the solution was filtered, cleaned by excessive amount of ethanol and dried. The results of analyzing oxygen and impurities contained in the powders when the treatment was finished. In Table 1, the oxygen content after the treatment tended to increase, far from being improved.

TABLE 1

|  | O | Fe | Al | Mg | Ca | Ni | Cl |
|---|---|---|---|---|---|---|---|
| Before treatment | % 2.1 | ppm 122 | ppm 23 | ppm 7.0 | ppm 44 | — | — |
| After treatment (Example 1) | 0.08 | 135 | 24 | 7.1 | 52 | ppm 2.7 | — |
| After treatment (Control 1) | 2.8 | 46 | 21 | 5.4 | 47 | — | ppm 39 |

EXAMPLE 2

Starting material used were SiC powders having means particle size of 0.8 μm. 1 wt. % of amorphous B under 325 mesh and phenol resin (corresponding carbon was 1 wt. % after heat treatment) were added to SiC powder as the sintering aids. The starting material were agitated, with propionic acid as a solvent, for 8 hours, and followed by mixing and crushing.

The mixed and crushed material were transferred into a sealed vessel and, successively introduced into a spray dryer to make granules. The average particle size of the granules was about 60 μm. Then, 1.5 wt. % tetrafluoroethylene resin having average particle size of 20 μm was added to the granules. The mixture of the granules with the tetrafluoroethylene resin was further mixed in a V-type mixer and, then, compacted, by a single die press and a cold isostatistic press, to form a rectangular compact of 10 mm in square and 55 mm in length. The compact density was 1.8 $g/cm^3$. The compact was placed in a tube furnace. In the tube furnace, the compact was heated at 300° C. to remove moisture adhering physically to the surface of the compact, and then, inside gases being exhausted until the furnace inside pressure had reached to the level of $10^{-3}$ Torr, the furnace inside being sealed. Subsequently, the temperature of the furnace inside was raised to 600° C., which was kept for 30 minutes. Furthermore, the temperature was raised to 900° C., and inside gases were exhausted until the furnace inside pressure had reached to the level of $10^{-3}$ Torr. Next, Ar of −70° C. dew point was introduced into the furnace and the compact was sintered for 30 minutes at 2050° C. in the atmosphere of Ar. The sintered compact had a bending strength of 106 $kg/mm^2$. In comparison with Control 2 hereinafter shown, Example 2 attained an remarkable increase in mechanical property, and was proved to be fairly effective in removing oxides existing on the surface.

CONTROL 2

Granules prepared on the same condition of Example 2 were the starting material. Zinc stearate 8 wt. %., as lubricant, was added to the granules to form a mixture, the mixture was mixed, for an hour, by V-shaped mixer. A single die press and a cold isostatic press was applied to the mixture to form a rectangular compact of 10 mm in square and 55 mm in length to form a compact 1.8 $g/cm^3$ in density. The compact was kept for 30 minutes at 600° C. in the nitrogen gas atmosphere to be dewaxed. Further, the dewaxed compact was sintered for 30 minutes at 2050° C. in the atmosphere of Ar. The sintered compact had a bending strength of 87 $kg/mm^2$.

What is claimed is:

1. A method for refining non-oxide ceramic powders which comprises the steps of:
   admixing 1 to 10 wt. % of polytetrafluoroethylene resin powders with non-oxide ceramic powders having oxide on surfaces thereof to form a mixture; and
   heating the mixture to 500° to 1300° C. in a non-oxidizing atmosphere to convert said oxide on the surface of the non-oxide ceramic powders into gaseous fluorides, and removing the gaseous fluorides.

2. The method according to claim 1, wherein said polytetrafluoroethylene resin powders are at least one selected from the group consisting of tetrafluoroethylene resin, tetrafluoroethylenehexafluoropropylene copolymer, tetrafluoroethyleneperfluoroalkylvinylether copolymer, and tetrafluoroethyleneethylene copolymer.

3. The method according to claim 3, wherein said polytetrafluoroethylene resin powders are admixed in an amount of 1 to 5 wt. %.

4. The method according to claim 1, wherein said non-oxide ceramic powders are at least one selected from the group consisting of nitride, carbide and boride.

5. The method according to claim 4, wherein said non-oxide ceramic is at least one nitride selected from the group consisting of silicon nitride, aluminum nitride, boron nitride, chromium nitride and titanium nitride.

6. The method according to claim 4, wherein said non-oxide ceramic is at least one carbide selected from the group consisting of silicon carbide, boron carbide and titanium carbide.

7. The method according to claim 4, wherein said non-oxide ceramic is at least one boride selected from the group consisting of titanium boride and zirconium boride.

8. The method according to claim 1, wherein said non-oxidizing atmosphere is a vacuum.

9. The method according to claim 1, wherein said heating is at a temperature of 600° to 1000° C.

10. The method according to claim 2, wherein said polytetrafluoroethylene resin is tetrafluoroethylene resin.

11. The method according to claim 2, wherein said polytetrafluoroethylene resin is tetrafluoroethylenehexafluoropropylene copolymer.

12. The method according to claim 2, wherein said polytetrafluoroethylene resin is tetrafluoroethyleneperfluoroalkylvinylether copolymer.

13. The method according to claim 2, wherein said polytetrafluoroethylene resin is tetrafluoroethyleneethylene copolymer.

14. The method according to claim 4, wherein said non-oxide ceramic powders are silicon nitride powders.

15. A method for refining non-oxide ceramic powders which comprises the steps of:
  admixing 0.5 to 10 wt. % of polytetrafluoroethylene resin powders with non-oxide ceramic powders having oxide on surfaces thereof to form a mixture; compacting said mixture into a green compact; and
  heating the green compact at 500°–1300° C. to to convert said oxide on the surface of the non-oxide ceramic powders to gaseous fluorides, and removing the gaseous fluorides.

16. The method according to claim 15, wherein said step of compacting the mixture includes applying cold isostatistic press treatment to the mixture.

17. The method according to claim 15, which further comprises the additional step of sintering the green compact from which the gaseous fluorides have been removed.

18. The method according to claim 15, wherein 0.5 to 2.5 wt. % of said polytetrafluoroethylene resin powders are admixed with the non-oxide ceramic powders.

19. The method according to claim 15, wherein said polytetrafluoroethylene resins are admixed in an amount of 1 to 5 wt. %.

20. The method according to claim 15, wherein said polytetrafluoroethylene resins are admixed in an amount of 1 to 2 wt. %.

* * * * *